FIXED BED DESULFURIZATION OF TIA JUANA RESIDUA

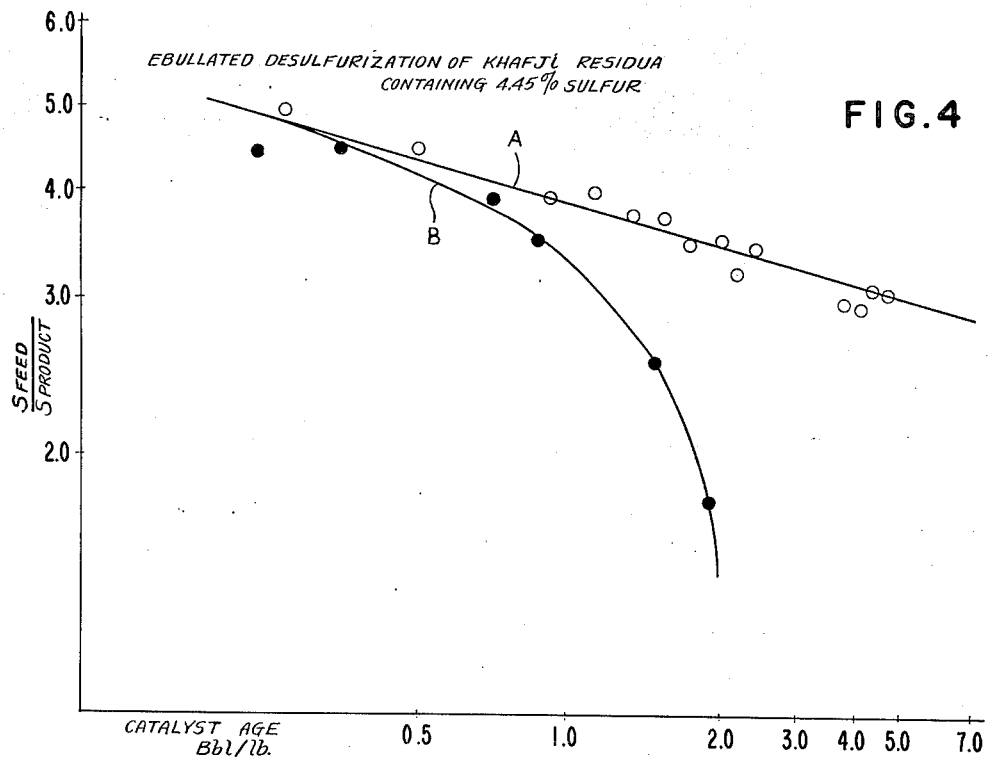
FIG.4
FIG.5
FIG.6
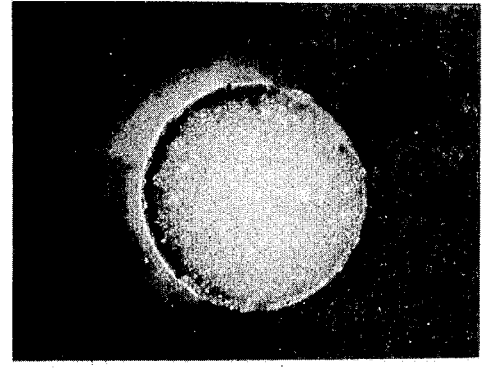

INVENTORS:
SEYMOUR B. ALPERT
RONALD H. WOLK
PETER MARUHNIC
MICHAEL C. CHERVENAK

BY Jules E. Goldberg
AGENT 3,630,888
HYDROCRACKING AND DESULFURIZATION
WITH A CATALYST HAVING MICROPORES
AND ACCESS CHANNELS
Seymour B. Alpert, Princeton, Ronald H. Wolk, Lawrence
Township, and Peter Maruhnic and Michael C.
Chervenak, Pennington, N.J., assignors to Hydrocarbon Research, Inc., New York, N.Y.
Continuation-in-part of application Ser. No. 678,727,
Oct. 27, 1967. This application Mar. 2, 1970, Ser.
No. 15,815
Int. Cl. C10g 23/02, 13/02
U.S. Cl. 208—109                                    8 Claims

ABSTRACT OF THE DISCLOSURE

A process for carrying out catalytic reactions, such as, hdyrogenation, desulfurization, hydrocracking, including halogenation, oxidation, sulfonation, nitration and amidization of hydrocarbons or the like in fixed, slurried, fluidized and ebullated beds utilizing a catalyst having micropores and access channels; and wherein the access channels are interstitially spaced throughout the micropores; and wherein 10 to 40% of the total pore volume is composed of access channels having diameters greater than 1000 angstroms; and wherein 10 to 40% of the total pore volume is composed of access channels having diameters between about 100 and 1000 angstroms; and wherein these access channels are substantially uniform as to their parameters and are relatively straight with minimum bending and constrictions; and wherein the remainder of the catalyst pore volume comprises micropores with diameters less than 100 angstroms with the remainder being 20 to 80% of the total pore volume. Methods for preparing this catalyst with respect to orientation of the access channels are described.

The present application is a continuation-in-part of the copending application Ser. No. 678,727, filed Oct. 27, 1967, for Catalysts, Method of Preparation of Same and Processes for Using Same, and now abandoned.

BACKGROUND OF THE INVENTION

This invention is related to the field of catalytic treatment of feed materials, such as hydrocarbons.

In many catalytic processes, such as those used in hydrogenation, desulfurization, hydrocracking and high rate conversion operations in the petroleum field, continuous operating periods of up to one to two years or more of unit operation are customary, due to factors such as geographical location, availability of skilled supervisory and repair personnel, size of reactors or other equipment, cost and time of shutdown and the like.

The shutdown of a catalytic reactor in a time less than the normal, desired, period of operability creates a very substantial financial burden on the operator, thereof, not only from the point of view of the manpower involved and the equipment maintained, but also in the loss of catalysts. The expense of catalysts used in operations such as petroleum refining is a major part of the costs of operation of reactors or refineries, and, thus, if the life of the catalyst or its efficiency can be extended or improved, substantial savings can be realized.

As an illustration, in ebullated bed type contacting systems, such as those described in Johanson, Re. 25,770, termination of the desired reaction occurs due to buildup of a sticky, carbonaceous material on the catalyst surface which deleteriously produces agglomeration of the catalyst and consequent collapse and/or defluidization of the catalytic bed.

Limitations on the operable period and efficiency of catalytic processes are, thus, especially critical in the treatment of petroleum residua and other petroleum-derived materials, since there are inevitably present from the feed materials utilized therein, adverse effects caused by deposition of materials, such as metals derived from absorbed asphaltenes, organically chelated metals, or other soluble metals. Chelated metals in such feeds usually are included in the class of compounds known as porphyrins, and such metal containing compounds are usually concentrated in that part of a petroleum residuum known as the asphaltene portion. The result of such metal deposition on the efficiency of the catalysts, for example in a desulfurization reaction, is such that the efficiency of the desulfurization decreases with time on stream and in proportion to the materials deposited on the catalysts. This is particularly true in the case of processes for the high level conversion of petroleum residua. In other words, asphaltenes or the like attempt to penetrate into the available, peripherally located micropore structure of the catalyst, but very rapidly clog these micropores and prevent any further travel of feed material into the body of the catalyst.

After the initial attachment of asphaltenes or the like on the peripheral surfaces of the catalyst, further access to most of the interior micropores, which comprise the vast majority of reactive surface of the catalyst, is, therefore, prevented by the blockage of the surface micropores. Hence, the prior art catalysts rapidly reach an inactive or relatively inactive stage, causing inefficiency and essential inoperability of the desired catalytic process.

A process may be termed "inoperable" when any one or combination of factors exist, such as decreased catalyst efficiency, poor product yield and/or stability, agglomeration or defluidization of the bed, poor temperature control, etc.

Examinations of cross sections of photomicrographs of known, prior art, catalysts show that this deposition occurs in a relatively uniform manner about the exterior surfaces of the catalyst, so that the materials so deposited and the remaining feed materials reach only the relatively few exposed exterior catalytic surfaces and form a relatively impenetrable covering over these surfaces, thereby making the interior catalytic surfaces unavailable to the feed material; i.e., the only micropores of these prior art catalysts which are accessible to feed material over any appreciable period of time are those relatively few micropores which are located in or on the exterior surfaces of the catalysts.

Such prior art catalysts and those of the invention generally have a normal pore-size distribution curve with most of the pores having diameters falling within the range of 20 to 60 angstrom units. Such pores are classified as micropores.

Catalysts normally used in hydrogenative processes or the like, particularly residua treatment processes, are generally formed of a carrier selected from the group consisting of alumina, silica and combinations of alumina and silica, together with a promoter selected from the class of metals from Groups VIb and VIII of the Periodic Table, oxides thereof and combinations and intercompounds of these metals and oxides thereof.

In the past ten to fifteen years there has been developed an extensive body of art in the catalyst field relating to recognition of the significance of pore structure in catalysts and to methods of preparation of catalyst to control the amounts of micropores and/or macropores contained therein, for the purpose of improving the activity of the catalyst. Thus, Anderson, Jr. et al., 2,890,162 discloses desulfurization treatment of residua using a catalyst having pores with diameters in excess of 1000 angstrom units. Similar disclosures are contained in Dinwiddie et al., 2,924,568. Gring et al., 3,267,025 and 3,245,919, discuss the use of catalysts having a double peaked pore distribution for hydrodesulfurization processes. Various other prior art disclosures including Updegraff, 2,813,821, discuss suggested methods for making catalysts having a defined pore structure. While such prior art teachings have improved the initial activity of catalysts, they have not solved the problem of providing long time, or sustained, efficient catalytic activity. This is because these prior art catalysts, while having an initial abundance of micropore structure at the catalyst surface, do not have sustained availability of subsurface micropores.

SUMMARY OF THE INVENTION

We have unexpectedly found that the prolonged, sustained extent of diffusion of feed material into a catalyst is the controlling factor with respect to catalyst life, efficiency and process operability, and that the extent of this diffusion is determined, not by the total or overall porosity of a given catalyst, but rather by the distribution and structure of large-sized access channels in the catalyst. We have discovered that by controlling these access channels in size, shape, percentage and/or orientation in a given catalyst, we can significantly improve and prolong catalyst life and efficiency, and provide sustained access of feed material to the vast majority of all interior micropore catalytic surfaces.

These channels must be interstitially spaced throughout the micropore structure of the catalyst in a fashion to be described in detail hereinafter.

We have discovered that the micropore structure of the prior art described above is required in a catalyst in order to have a sufficiently large active surface area, but that it is also essential to have selectively sized and structured large channelways or access channels going through the interstitial structure of the catalyst to provide access for the feed into the interior of the catalyst. These micropores and channels must comprise a substantial majority of the overall volume of the catalyst. These access channels, in themselves, do not particularly provide any catalytic surface area; rather they allow the feed, including contaminants, to pass completely through the body of the catalyst so as to reach all active surface areas provided by the micropore structure of the catalyst.

Moreover, we have found that the ratio of the pore structure occupied by these channels must fall within certain critical limits, relative to overall porosity.

The catalyst of the invention must have a structure in which those access channels having diameters between about 100 and 1000 angstrom units constitute 10 to 40 percent of the total pore volume and in which those access channels having diameters greater than 1000 angstrom units constitute between about 10 to about 40 percent of the total pore volume while the remainder of the pore volume comprises 20 to 80 percent of micropores with diameters less than 100 A. Catalysts having less than 10 percent of their total pore volume due to access channels having diameters greater than 100 angstrom units are not efficient except during a brief initial period and cannot allow adequate access to the interior micropore structure. Extensive experimentation has shown that catalysts having greater than 40 percent of their total pore volume due to access channels with diameters greater than 1000 angstrom units are subject to excessive decrepitation.

Furthermore, we have found that the catalysts having the properties of the invention must have, in order to achieve maximum efficiency, access channels which possess the following characteristics, it being understood that all catalysts, whether extruded or microspherically formed, consist of individual minute particles chemically or physically formed into agglomerates or nuclei, which in turn are bonded or chemically joined to form overall catalytic structures:

(1) Channels which have relatively uniform diameter;

(2) Channels which are substantially linearly shaped so that they are devoid of, and exclude, blocking turns or deviations in direction forming obstructions to the passage of feed molecules or miscelles including (a) channels which are radially oriented from the nuclei, and (b) channels whose orientation is homoplanar or parallel throughout;

(3) Channels which are on the order of many magnitudes of the micropores, i.e., channels of at least 100 angstrom units in diameter and, a substantial number, in the range of 10,000 to 50,000 angstrom units;

(4) Channels of relatively uniform dispersion, it being understood that, even in the hereinafter summarized and detailed processes of manufacture, some heterogeneity of the structure is inevitable.

Additionally we have found that previous, known are measurements fo porosity are inaccurate. Such prior art pore measurements have been generally made either with nitrogen diffusion for micropores or mercury diffusion for macropores, in instruments known as porosimeters. The problem exists, however, that such known measurements and parameters do not satisfactorily define or predict the probable performance of a given catalyst in a given catalytic process.

Thus, so called BET measurements, see, e.g., JACS 60, 309 (1938), have been long recognized as deficient. Therefore, the prior art has made various attempts to augment such tests with other ad- or -absorption tests. None of these known suggested tests have been, or is, capable fo reliability so far as prediction of field performance of catalysts is concerned. We have invented a simple test for overall catalytic efficiency utilizing a standard residuum and organic solvent therefor. This test avoids the deficiencies of the prior art since it:

(1) Eliminates use of high surface tension materials;

(2) Eliminates use of negligible surface tension materials, and (3) Eliminates use of non-commercial diluents.

In summary of this aspect of the invention, there is disclosed herein a simple and stringent test for catalytic surface availability, using diluted petroleum residuum penetration.

Moreover, this invention comprises a plurality of methods to produce catalysts having the properties described above and hereinafter. While additional, specific, illustrations are given below, the catalysts of the invention generically may be formed in the following fashion:

(1) Inclusion within the catalytic nuclei of a material which is capable of radial escape from each of said nuclei during fabrication, leaving radial, relatively straight, substantially uniform, channels, including (a) inclusion within the catalytic material of a substance removable by processes such as leaching or the like, or by sudden explosive removal, which removal progresses radially inwardly or outwardly to produce radial channels;

(b) formation of nuclei having incorporated therein progressively and radially formed acicular crystals or other similar, remomable material; and (2) Stratification of removable substances, such as fibers, within the nuclei, followed by removal thereof to produce homoplanar and/or parallel channels.

The invention further comprises the use of the above and hereinafter described catalysts in certain specific processes, including: desulfurization, hydrocracking, halogenation, oxidation, sulfonation, nitration, amidization and generic hydrogenation of hydrocarbon materials.

DESCRIPTION OF THE DRAWINGS

FIG. 4 is a graph showing the difference in catalytic life between an ebullated bed catalyst having the access channels of the invention and similar beds utilizing commercially available catalysts B and C.

FIG. 5 is a cross-sectional photomicrograph of an extruded catalyst of the invention used in the process graphically illustrated in FIG. 4 and corresponding to curve A thereof.

FIG. 6 is a cross-sectional photomicrograph of an extruded prior art catalyst whose use resulted in curve B of FIG. 4.

DESCRIPTION OF PREFERRED EMBODIMENTS OF THE INVENTION

The following specific example will serve, keeping in mind the foregoing, to illustrate the improvements accomplished by our invention.

EXAMPLE I.—FIXED BED DESULFURIZATION OF TIA JUANA RESIDUA

Feed characteristics:
16.6° API
2.03% sulfur
364 p.p.m. vanadium
54 p.p.m. nickel
Reactions conditions:
Temperature—780° F.
Pressure—2000 p.s.i.g.
SV—1.0

Figure 1:
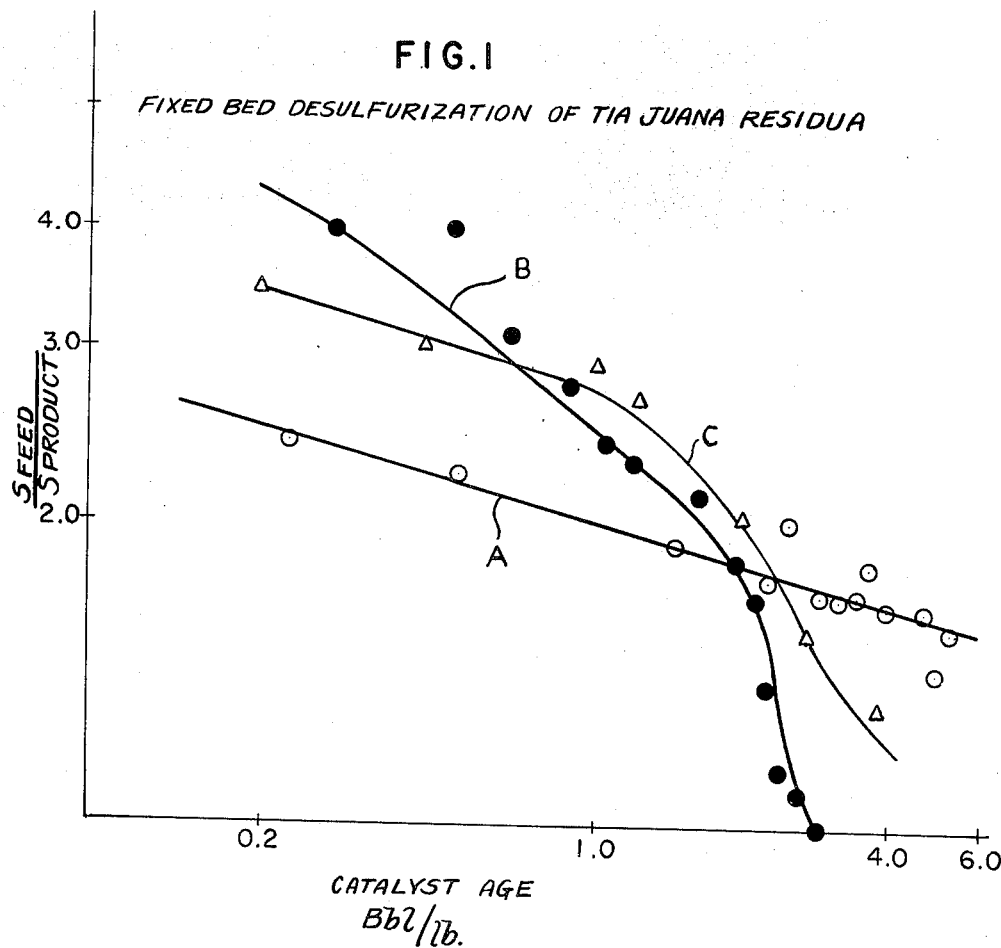
FIG. 1 is a graph showing the difference in catalyst life in a fixed bed desulfurization system between a catalyst having the access channels of the invention and prior art catalyst of the same chemical composition but not having such access channels, as set forth in Example I.

The sharp decrease in catalyst performance of prior art catalysts used under these conditions, compared with a catalyst of the invention having the desired access channels is clearly shown in FIG. 1.

It is to be understood that in this and all other figures, those curves designated as A relate to catalyst having the structure of the invention whereas those curves designated as B relate to standard commercial catalysts having the same chemical composition but lacking the access channels of the invention and those curves designated as C relate to standard commercial catalysts having the same chemical composition as A and B and having between 10 and 20 percent of their total pore volume contributed by access channels having diameters greater than 1000 angstrom units, but having less than 10 percent of their total pore volume contributed by access channels with diameters between 100 to 1000 angstrom units.

Specifically, FIG. 1 discloses that, as discussed above, commercial, prior art catalysts, tested under commercial conditions for fixed beds, exhibit high initial performance characteristics, and, in a relatively short time, fail. This example is compiled from average figures for a plurality of catalysts composed according to the invention and a similar plurality of prior art catalysts. Despite extensive experimentation of other catalysts, no results have been found which do not substantiate these conclusions.

While most of the illustrations given hereinafter relate to a designated class of carrier and/or promoter type of catalyst, we have found that other known catalysts, including the metals of Groups I, II and VII, also fall within the definitions of the invention, if suitably formed.

Figure 2:
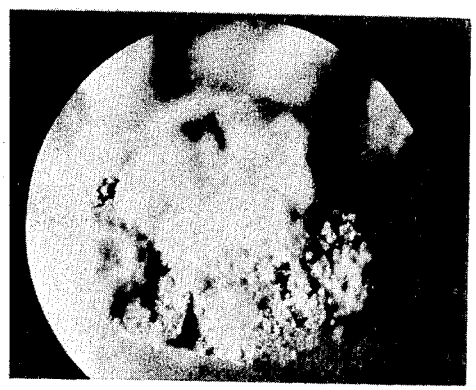
FIG. 2 is a cross-sectional photomicrograph of the catalyst of the invention, used in the process graphically illustrated in FIG. 1 and corresponding to curve A thereof.
Figure 3:
FIG. 3 is a cross-sectional photomicrograph of a prior art catalyst whose use resulted in curve B of FIG. 1.

FIGS. 2 and 3 are photomicrographs of cross-sectional views of the respective catalysts from runs under the conditions of the example. Deposits on the catalysts show up as the light colors around and between the catalyst particles, and it is seen that there is a sharp boundary between the deposits and the interior of the catalyst in FIG. 3.

FIG. 2 shows the cross section under 70× magnification of a catalyst of the invention used in Example I and corresponding to curve A of FIG. 1. The large access channels are easily visible as the darker shaded areas within the body of the particle. It is also seen that the boundary between the deposit and the inner portion of the catalyst is quite diffused and that the penetration of the feed materials into the catalyst is markedly greater than that shown in FIG. 3 which is a similar, magnified cross-sectional view of a catalyst not having the access channels of the invention and corresponding to curve B of FIG. 1, after use under the conditions of Example I.

FIG. 4 illustrates a similar process to that of FIG. 1, except that in this case there are shown tests utilizing ebullated beds. The conditions thereof are set forth as follows in Example II:

EXAMPLE II.—EBULLATED BED DESULFURIZATION OF KAFJI RESIDUUM

Feed materials contains 4.45% S
Reactions conditions:
SV—1.0 $V_f$/hr./$V_r$
Pressure—2400 p.s.i.g.
Temperature—780° F.

FIG. 5 is a cross-sectional view of a catalyst having the properties of the invention after it has been utilized under the process conditions set forth in Example II, its performance corresponding to curve A of FIG. 4.

FIG. 6 is a cross-sectional photomicrograph of a prior art catalyst utilized under the conditions of Example II, its performance corresponding to curve B of FIG. 4.

As to FIGS. 2 and 3, the deposition and penetration of feed material shows in the contrast if black and white, and it is seen that penetration into the catalyst of the invention of FIG. 5 is markedly greater than that into the prior art catalyst of FIG. 6.

Figure 7:
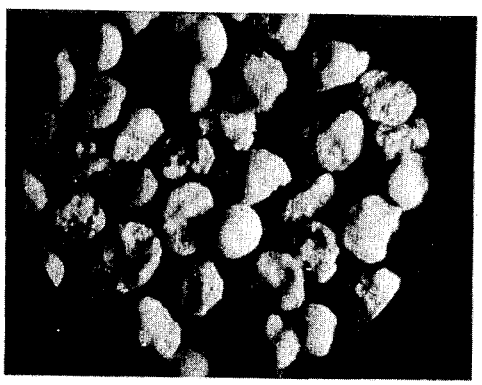
FIG. 7 is a photomicrograph of a catalyst of the invention utilized in the process graphically shown in FIG. 4 under curve A and corresponding to FIG. 5, except that the catalytic nuclei are microspherical.
Figure 8:
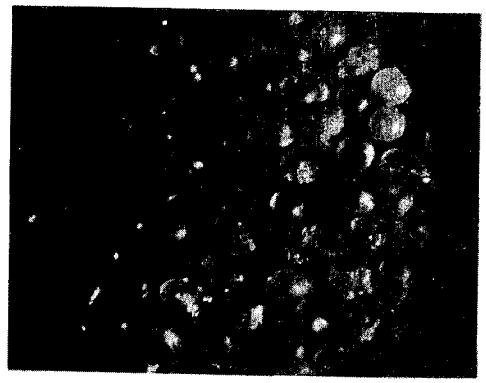
FIG. 8 is a figure corresponding to FIG. 7 except that the microspherical particles, whose outer contamination is shown therein, are formed from a prior art structure.

As explained above, FIGS. 7 and 8 are photomicrographs respectively similar to FIGS. 5 and 6 in that FIG. 7 corresponds to FIG. 5 and represents a catalyst of the invention utilized under the conditions of Example II, whereas FIG. 8 corresponds to FIG. 6 and represents a prior art catalyst utilized under the conditions of Example II. The only difference between FIGS. 5 and 6 and their related FIGS. 7 and 8 is that in the case of the catalysts shown in FIGS. 7 and 8, the basic structure thereof comprises microspheres, rather than extrudates.

The problems relative to catalyst efficiency and onstream time are perhaps most notable in the case of high level conversion or desulfurization of residuum, such as petroleum atmospheric and/or vacuum distillation bottoms, shale oil, shale oil residues, tar sands and coal derived hydrocarbon and hydrocarbon residues.

Most important commercially of such processes are those in which the temperature is in the range of about 600–900° F., the pressure is in a range of about 500 to about 5000 p.s.i.g., and wherein the hydrogen partial pressure is between 65 and 95 percent of the total pressure, and wherein the space velocity is in the range of about 0.2 to 5.0 volume of feed per hour per volume of reactor ($V_f$/hr./$V_r$) and wherein the hydrogen rate is within the range of from about 1000 to about 10,000 s.c.f./bbl.

Figure 9:
FIG. 9 is a photomicrograph of a catalyst utilizing the structure of the invention in a high conversion ebullated bed process of the type discussed in Example IV.
Figure 10:
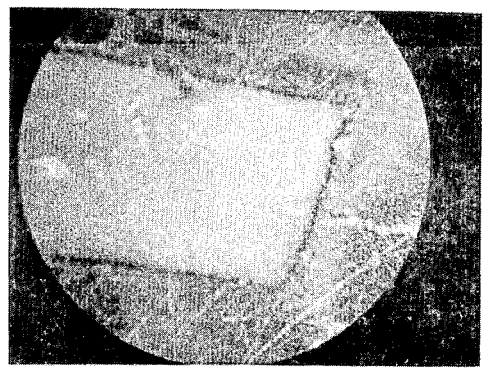
FIG. 10 is a photomicrograph showing a prior art catalyst used in the identical high conversion rate ebullated bed process as the catalyst of FIG. 9.
Figure 11:
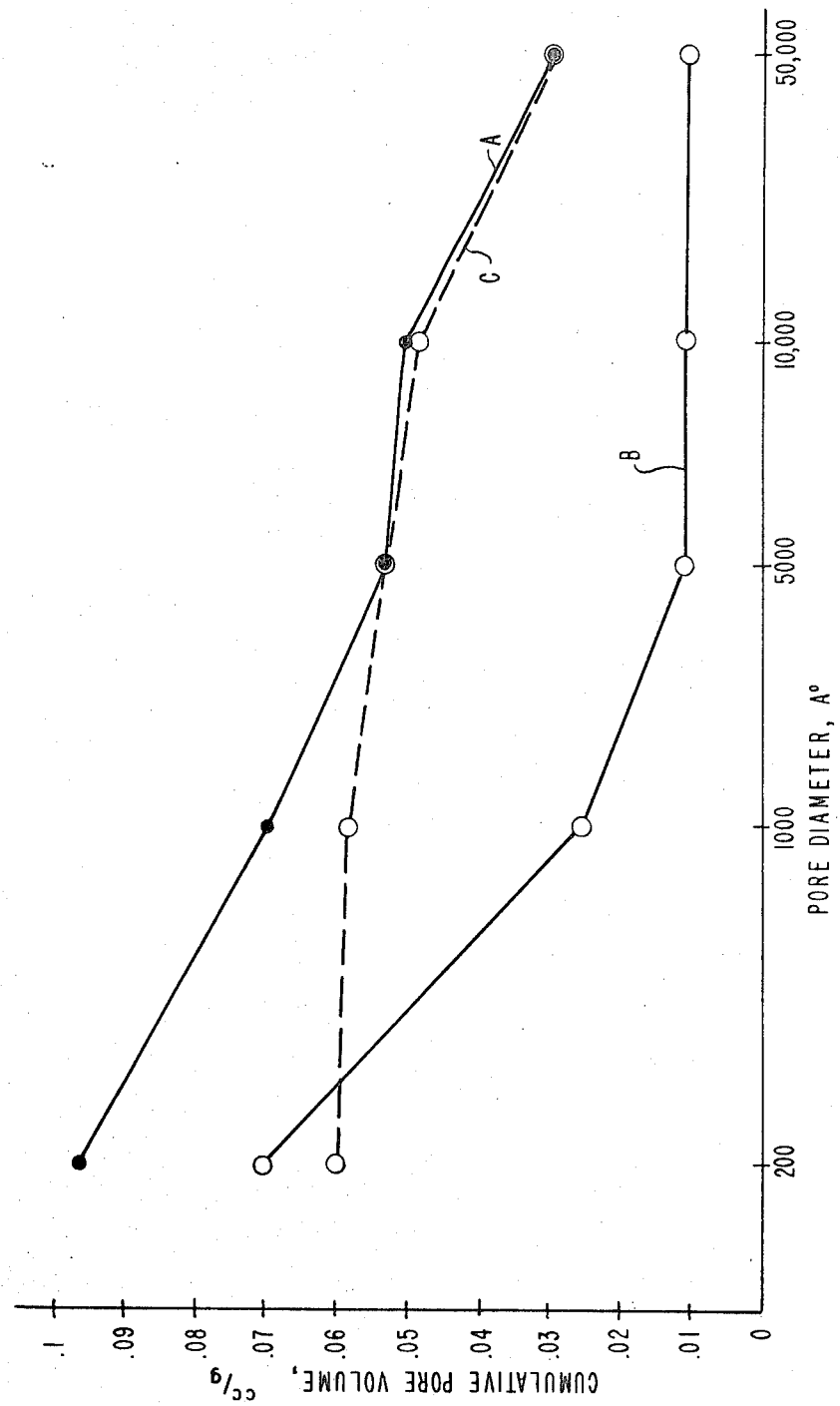
FIG. 11 is a graph showing the difference between the ratios of access channels for a catalyst of the invention, again designated as curve A, and standard prior art commercial catalysts, again designated as curves B and C.

Examples III, IV and V, set forth below, are typical of high conversions of residua, utilizing catalysts having the structure of the invention and catalysts of the prior art. FIG. 9 shows the catalyst of the invention after use in the process of Example III, whereas FIG. 10 is an illustration of a typical one of a large number of prior art catalysts after use under the conditions set forth in Example III.

EXAMPLE III.—HIGH CONVERSION HYDROGENATION OF KUWAIT RESIDUA, EBULLATED BED

[Feed 7° API, 5.2 weight percent S]

|  | With channels of invention—A | Without channels of invention—B |
|---|---|---|
| Catalyst age, bbl./lb | 2.6 | 0.6 |
| Conversion, V. percent | 77.5 | 74.7 |
| Operable | Yes | No |
| Catalyst size, in | ½₂ | ½₂ |
| Catalyst composition | (¹) | |
| Operating conditions: | | |
| H₂ press., p.s.i.g | 1,950 | 2,190 |
| Temp., °F | 818 | 818 |
| Space velocity, $V_f$/hr./$V_r$ | 0.4 | 0.4 |
| Cat. sp. V., B/D/lb | 0.08 | 0.07 |
| H₂ rate, s.c.f./bbl | 7,200 | 14,000 |

¹ Al₂O₃—CoO—MoO.

EXAMPLE IV.—HIGH CONVERSION OF KUWAIT RESIDUUM, EBULLATED BED

|  | With access channels of invention—A | | Without access channels of invention—B |
|---|---|---|---|
| Time on stream, hrs | 131–155 | 203–227 | 124–136 |
| Catalyst size (U.S. Mesh.) | 100–270 | | 100–270 |
| Catalyst composition | (¹) | | |
| Feed material | Kuwait vacuum residuum | | |
| Percent sulfur in feed | 5.6 | | |
| Feed, °API | 7.0 | | |
| Operating conditions: | | | |
| H₂ pressure, p.s.i.g | 2,200 | 2,200 | 2,200 |
| Temperature, °F | 832 | 829 | 834 |
| Space velocity, $V_f$/hr./$V_r$ | 0.76 | 0.5 | 0.80 |
| Catalyst addition rate, lb./bbl | 0.1 | 0.1 | 0.1 |
| Conversion of 975° F. plus percent | 75 | 82.5 | 76 |
| Operability of reactor | Yes | Yes | No |

¹ Al₂O₃—CoO—MoO.

EXAMPLE V.—HIGH CONVERSION HYDROGENATION OF KUWAIT RESIDUUM

[Feed: 7° API, 5.2% sulfur]

|  | With access channels of invention—A | Without access channels of invention—B |
|---|---|---|
| Catalyst age, B./lb | 2.1 | 1.0 |
| 975° F + V percent on feed | 15.1 | 30.0 |
| Conversion of 975° F. plus in feed, percent | 84.9 | 70.0 |
| Operability | Yes | No |
| Catalyst size, in | ½₂ | ½₂ |
| Catalyst composition: | | |
| Percent NiO | 8.3 | 5.8 |
| Percent MoO₃ | 13 | 14.9 |
| H₂ press., p.s.i.g | 2,250 | 2,250 |
| Temperatur, °F | 840 | 820 |
| Space velocity, $V_f$/hr./$V_r$ | 0.5 | 0.5 |
| Catalyst space velocity, B./D./lb. cat | 0.1 | 0.1 |
| Hydrogen rate, s.c.f./bbl | 7,000 | 7,000 |

Examination of microphotographs of catalysts used under the conditions of Examples IV and V show virtually identical structures as those illustrated in FIGS. 9 and 10.

Carbon-hydrogen analysis of spent catalysts serves to further augment the above explanation. Table I, given below, details the carbon and hydrogen analyses of spent catalysts from Example III, showing that the deposit on a typical prior art catalyst contained 1.95% hydrogen, whereas the carbonaceous deposit on the catalyst of the invention contained a hydrogen content of only 1.07%.

TABLE I.—C–H ANALYSIS OF SPENT CATALYST

| Catalyst | Percent C | Percent H |
|---|---|---|
| Without access channels of the invention | 20.18 | 1.95 |
| With access channels | 24.60 | 1.07 |

It is understood that deposits having a lower hydrogen content are far less sticky and deleterious than deposits having higher percentages of hydrogen.

As set forth above, we have found, after extensive experimentation, that all known previous porosity tests are misleading and indeterminative for commercial catalysts. So-called BET numbers must be correlated with the actual conditions under which they are determined, and these, basically, comprise, singly, or in combination: (1) mercury penetration, (2) nitrogen penetration and (3) commercial solvent (e.g. benzene, toluene, isopropyl alcohol) penetration. None of these is indicative of field acceptability of a catalyst.

Therefore, we have created a new test which can be used with most commercially available porosity meters to determine catalytic life and efficiency. Basically, our invention in this respect comprises the realization that tests of catalysts using ultra high surface tension agents, ultra low surface tension agents, commercial solvents or the like are inadequate. Our test, while stringent, accurately rates potential catalytic efficiency and life expectancy by testing porosity with a combined deleterious agent and common diluent material.

As illustrative of our new test, and so as to define catalysts in terms of useable figures, hereinafter designated as "Penetration Numbers," we give the following examples:

The catalyst to be tested is soaked in a dilute residuum-benzene mixture having the composition described in Table II for fifteen minutes at room temperature. The surface oil is removed by blotting with absorbent paper. The catalyst is cross-sectioned and examined under 70× magnification.

TABLE II

Description of Dilute Benzene and Residuum Mixture for Penetration Number Test

| Component | Kuwit residuum | Reagent grade benzene |
|---|---|---|
| Wt. percent in blend | 50.0 | 50.0 |
| Specific gravity, 20° C., g./cc | | 0.879 |
| Percent on crude | 22 | |
| Gravity, °API | 7 | |
| Sulfur, wt. percent | 5.3 | |
| Vanadium, p.p.m | 100 | |
| Nickel, p.p.m | 35 | |
| Asphaltenes (pentane insolubles) wt. percent | 17 | |
| Ramsbottom residue, wt. percent carbon | 18 | |
| Viscosity, Saybolt furol seconds, at 210° F | 750 | |
| Viscosity, Saybolt furol seconds, at 300° F | 60 | |

Microscopic inspection or the like is used to physically measure the percent penetration which has occurred on catalyst sample, since a distinct color differential exists between that portion of the catalyst which has been penetrated, and that portion in which no penetration has occurred.

We have discovered excellent correlations between these Penetration Numbers and efficiency, overall operability, and catalyst life in residuum hydrogenation and the like processes. It should be reiterated that the Penetration Number measurement has a distinct advantage over normal porosimeter measurements in that it reflects those parameters of the catalyst which are most important under actual operating conditions, and, that in this respect, it accurately measures these parameters, whereas the previously known tests do not test for catalyst conditions such as constrictions, orientation, passage size and the like.

Table III gives specific examples of (A) those catalysts which incorporate the structure of the invention and (B) a series of selected, chemically comparable, prior art catalysts. Catalyst (C) is the catalyst having less than 10 percent of the total pore volume contributed by access channels with diameters between 100 and 1000 angstrom units. It is important to note here that even though there are a substantial number of access channels with diameters above 1000 angstrom units, the Penetration Number analysis still shows this to be a relatively inefficient catalyst which was sustained by subsequent experimentation. All numbers in this table are computed utilizing the specific penetrant of Table I:

tion of these catalysts, as described in detail above and hereinafter.

Catalysts, regardless of the process whereby they are formed, generally comprise a carrier and some form of physically and/or chemically combined promoter.

While the catalysts of the invention do include all catalytic materials, they further relate specifically, as stated above, to the preferred embodiments in which the carrier is selected from the group consisting of alumina, silica and combinations thereof, and the promoter is selected from the group consisting of the elements of Group VI$b$ and Group VIII of the Periodic Table, oxides thereof, combinations and intercompounds of such metals and metal oxides.

For high conversion hydrogenation a standard commercial catalyst may consist of an alumina carrier promoted with cobalt molybdate, as an illustration; a similar catalyst may consist of a carrier of an aluminum silicate together with a promoter of nickel tungstate.

Regardless of the composition of the carrier and/or the promoter, the present invention is confined to catalysts

TABLE III.—PENETRATION NUMBER TESTS

| | HRI No. | Cat. diameter, in. | Percent CoO | Percent MoO$_3$ | Percent NiO | Pore volume, cc./gm. | Avg. pore diameter, A. | Surface area, M$^2$/gm. | Penetration No.; percent of diameter penetrated |
|---|---|---|---|---|---|---|---|---|---|
| A1 | 2145A | 1/32 | 3.5 | 13.3 | | 0.45 | 69 | 260 | 100 |
| A2 | 2401 | 1/32 | 3.5 | 12.5 | | 0.5 | 65 | 307 | 95 |
| A3 | 2282 | 3/64 | 3.4 | 12.8 | | 0.47 | 62 | 310 | 95 |
| A4 | | | | 1.3 | 3.3 | 0.48 | 63 | 355 | 95 |
| B1 | 2332 | 1/32 | 3.8 | 12.1 | | 0.48 | 77 | 249 | 5 |
| B2 | 2374 | 1/16 | 3.0 | 15.0 | | 1.05 | | | 35 |
| B3 | 1131 | 1/32 | 3.7 | 13.1 | | 0.38 | 55 | 276 | 10 |
| B4 | 2210B | 1/32 | 3.4 | 12.4 | | 0.49 | 67 | 290 | 5 |
| B5 | 2318 | 1/32 | 3.7 | 12.2 | | 0.48 | 70 | 277 | 5 |
| B6 | 2301A | 1/32 | 3.3 | 18.0 | | 0.44 | 74 | 236 | 5 |
| B7 | 1955 | 1/32 | 3.1 | 13.7 | | 0.50 | 81 | 246 | 5 |
| B8 | 954 | 1/32 | 3.0 | 12.5 | | 0.43 | 56 | 307 | 5 |
| B9 | 2270 | 1/32 | | 14.9 | 5.8 | 0.45 | 61 | 294 | 5 |
| B10 | 2373 | 1/16 | 6.0 | 20.0 | | 0.81 | | | 40 |
| B11 | 2361 | 1/32 | | 19.2 | 5.3 | 0.46 | 97 | 189 | 5 |
| C1 | 2342 | 1/32 | 3.2 | 15.2 | | 0.45 | 71 | 255 | 5 |

We have found that a catalyst having the properties of the invention must have a Penetration Number in excess of 30.

Figure 12:
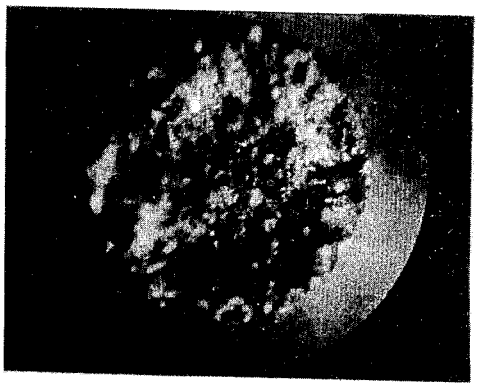
FIG. 12 is a cross-sectional photomicrogarph of a catalyst having the access channels of the invention which was soaked in the hereinafter described dilute residuum-benzene mixture for fifteen minutes at 75° F.
Figure 13:
FIG. 13 is a cross-sectional photomicrograph of a prior art catalyst which was soaked in the same diluted residuum-benzene mixture used for FIG. 12 and under identical conditions.

FIG. 12 shows a photomicrograph of a cross section of a catalyst used in this test, this catalyst having the access channels of the invention. All of the interior of the catalyst has been penetrated by the residuum-benzene mixture. In contrast, FIG. 13 shows a photomicrograph of a typical prior art catalyst and shows that there is only about ten percent penetration of the residuum-benzene mixture into the catalyst.

Figure 14:
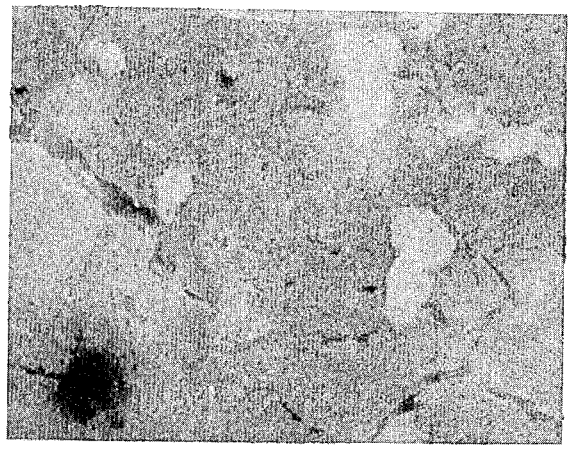
FIG. 14 is a photomicrograph cross-sectional illustration of a typical catalyst of the invention, this catalyst having access channels within a range of diameter centering in the 30,000 angstrom unit vicinity.

In order to have both sufficient strength to avoid significant mechanical attrition and yet still possess substantial reactive surface area, a catalyst of the invention must have about one access channel with diameter greater than 100 angstrom units for about every 80,000 micropores. Even so, however, the catalysts of our invention normally contain a number of channels which have diameters far in excess of 1000 angstrom units. FIG. 14 is a photomicrograph showing typical access channels of the invention with diameters of 10,000 angstrom units and up to 30,000 angstrom units. These catalysts of the invention generally have a total pore volume within about the range of about 0.4 to 1.0 cc./gram, and preferably centered and concentrated at 0.5 cc./gram. We have found, however, that having access channels with diameters greater than 1000 angstrom units, in itself, is not sufficient to produce the results obtained with the catalyst of the invention. The catalyst must have in addition, at least ten percent of its total pore volume due to access channels having diameters between 100 and 1000 angstrom units.

The above illustrations serve to delineate the catalysts of the invention in contrast to prior art catalysts.

It is to be understood, however, that the present invention further comprises specific methods for the preparation having incorporated therein the desired micropores and access channels.

In other words, the new methods of preparation of catalysts which have the desired properties of this invention do not relate to the basic methods of chemical formation of the catalytic materials such as those described above. As is well known in the art, the materials which comprise the carriers, as well as the materials which comprise the promoters, may generically be separately prepared followed by impregnation or deposition or may be coprecipitated.

As illustrative of the prior art disclosing such basic methods of catalytic formation attention is directed to Webb et al., 2,406,646 and Owen 2,606,159.

The inventive concept contained herein relates specifically to physical alterations made to the catalysts during their preparation, regardless of the generic preparation method thereof.

Following the outline given above in the Summary of the Invention there are delineated hereafter certain, illustrative, specific preferred embodiments of methods of preparation of the catalysts of the invention.

The first generic system consists of those processes in which there is included within the catalytic nuclei a material which is capable of radial escape during fabrication leaving the radial relatively uniform channels of the invention.

EXAMPLE VI

An aluminum hydrogel is precipitated in accordance with the teachings of Example I of Burbidge et al., 2,162,607, except that the gel has, during its formation, added thereto about 1% by volume of aluminum trihydrate seed of 3.2 M strength, consisting of aluminum hydrate covered particles of carbonaceous material having a preferred range in size of 600 to 800 mesh, and being formed during a typical Bayer process, as taught in the prior art, each seed having general dimensions in the range of 400 mesh and being, as stated, externally covered with aluminum trihydrate. Such seeds are added in sufficient quantities so as to produce a final ratio of about one carbonaceous particle to each 1000 gellated nuclei in the finished mix. Thus, for example, a specific gel after seeding in this fashion will contain approximately 10 carbonaceous particles for each milligram of precipitated gel. This gel, after filtering and drying, will be found to consist of basic catalytic carrier particles of aluminum hydrate, regardless of its designation on the Edwards and Frary scale, each having therewithin a carbonaceous particle. Such dried catalytic particles are then directly impregnated with a solution containing, e.g., 0.5 molar quantum of salts of promoters, such as, the soluble salts of platinum, niobium, tungsten, cobalt, molybdenum or the like promoter metals.

Preferably, however, these catalytic nuclei are shot in discrete stream form into a furnace operated under a pressure of about $\frac{1}{10}$ atmosphere and at a temperature in the range of 600–800° F. The materials so shot are collected in a continuous, slow moving, e.g., 1 ft./sec. conveyor belt to remove them from the furnace. Examination of the particles shows that each individual nucleus has relatively uniformly radially dispersed access channels according to the teachings of the invention, such channels spreading from the interior of each individual nucleus to the exterior thereof, such channels occupying between about 10 and about 20 percent of the overall pore volume. These particles may then be impregnated with a suitable, soluble salt of a catalytic promoter metal. Following this they are further dried and calcined to produce the desired, activated catalytic structure. In either alternative procedure, i.e., those in which the production of the channels is made before and those in which it is made after incorporation of the promoter material, the resultant structure will fall within the teachings of the invention.

Among the carbonaceous substances which may be utilized are, for example, sawdust, graphite, cellulosic materials and the like.

It is to be understood that other materials capable of producing explosive, radial, gaseous escape from the nuclei may be utilized. Thus, as an illustration, there is given:

EXAMPLE VII

Included within the aluminum hydrate nuclei are centrally located crystalline aromatic hydrocarbon particles having a size in the range of 600 to 1800 mesh. This example uses naphthalene, the remainder of this example following either alternative embodiment of Example VI, i.e., the naphthalene is incorporated into the alumina trihydrate nuclei, dried, exploded and then impregnated, or the nuclei incorporating the naphthalene is impregnated and then dried and exploded, it being understood that in either alternative embodiment the catalytic material is, after the above treatment, calcined in any manner known to the art so as to properly activate the carrier and/or promoter.

It is to be further understood that the materials suitable for use in Example VII constitute any materials which are relatively insoluble in the aqueous or other form of solvent of the carrier utilized during catalyst formation, and that they have a relatively low boiling point and are relatively inert to the catalyst materials. Proper choice of suitable conditions is dictated by the specific catalytic and removable materials used, and by the conditions utilized in the furnace. Such a furnace corresponds to those well known in the arts for the production of expanded materials, such as those used for the formation of expanded vermiculite, Masonite, cereals or the like, including those furnaces which are normally utilized in flash evaporation.

If the material incorporated within the nuclei is oxidizable, such as the materials discussed in relation to Example VI, then, of course, the furnace atmosphere must contain oxygen.

It will be further understood that the particular temperatures and/or pressures utilized must be empirically determined in accordance with the material incorporated within the nuclei, so as to produce the access channels having the herein defined relationships.

The access channels of the invention are also capable of production by various methods which produce channels, radially directed and similar to those produced above, by a further subgeneric, alternative procedure. As exemplary thereof, there is given:

EXAMPLE VIII

Incorporated within the feed of Bayer process alumina seed material, or within the feed of seed material for alumina silica coprecipitation is a material such as p-secondary butyl phenol which will acicularly grow radially outward during formation of the catalytic nuclei. In this specific illustration 0.1 M strength p-secondary butyl phenol in ethyl alcohol solution is added to 2.6 M strength aluminum hydrate aqueous solution having simultaneously added thereto 0.1 M aqueous sodium silicate solution, the proportions of the additives being of substantially equal volume. The resultant mixture is allowed to stand in a relatively quiescent state, with gentle stirring, for approximately twenty minutes at ambient temperature. The resultant precipitate is then filtered and dried.

The dried material is then leached with ether, following which it is further dried and impregnated, if desired, with a suitable solution of soluble catalyst promoter. The remaining treatment follows the teachings of the prior art.

Alternatively, to produce a similar structure in accordance with the teachings of the invention there is given the following example:

EXAMPLE IX

Any of the catalytic gel materials listed above, or those others known to the art, have incorporated therein, linear, removable material. Thus, specifically, an aluminum hydrate, in the form of partially calcined gel, and having a weight of about 1.3 kilograms is mixed with, at ambient temperature and pressure, approximately 37 grams of reconstituted, cellulosic fiber particles falling within the generic class termed rayon. The mixture is homogenized in a Banbury mixer and is then fed to a screw-type plastic extruder, wherein it is further preliminarily mixed. The mixture is then further extruded under high pressure, orienting the fibers along the longitudinal axis of the extrudate.

The rough, plastic extrudates resulting from this procedure are then given a preliminary calcination treatment at about 500° F. for two hours. Thereafter, the fibers are removed by leaching, solvent extraction or oxidation to produce the catalysts of the invention. In this specific example, the cellulosic fibers are completely removed by an oxidation process at ambient pressure and at 800° F. for a period of one-half hour.

Thereafter, the catalytic material having the oriented and radial channels of the invention is impregnated with 0.1 M strength solutions of nickel chloride and tungsten chloride, dried at 800° F. for three hours in an oxygen containing atmosphere, finally ground and calcined at activating temperatures and periods.

While cellulosic fibers have been specified above, there can be successfully produced the catalytic structures of the invention using other natural and synthetic fibers such as: linen, cotton, silk, polyamides, polyvinyl and polyvinylidene chlorides, polyesters, and mixtures thereof. As an observation, reference should be made to the fact that the most successful results of this procedure occur surprisingly, in those cases where the fibers are not completely uniform in diameter, but incorporate minuscule follicles or are themselves deliberately extruded in cross-section lobular form. Catalysts having access channels produced from such fibers have more uniform parameter access channels than those produced from diametrically uniform, circular fibers, apparently due to some molecular or electrical affinity operative during formative processes.

A further specific example of formation of these forms of the catalyst of the invention is given in:

EXAMPLE X

The partially calcined catalytic material of Example X has incorporated therein, instead of the fibers of Example IX, inorganic, elongated crystals of relative difficultly soluble material, such as commercially available calcium laurate, or other relatively, but differentially and preferentially soluble, elongated crystals, relative to the catalytic material. Specifically, one kilogram of aluminum hydrate gel, dried for two hours at 400° F. is mixed in a Banbury mixer with forty milligrams of needle-like calcium laurate crystals for twenty minutes. The resultant mixture is extruded as before, is leached for one hour in ethyl alcohol, impregnated and dried and calcined at activation temperatures.

In this and the preceding examples, it is understood that the materials, ratios thereof, feed rates thereof, temperatures and pressures may be varied, so long as they do not deviate from those which produce formation of the catalysts defined by the invention. Succinctly expressed, it is possible to vary the procedures outlined herein so as to make catalysts which do not have the prerequisites of the invention, including the specified ratios of access channels to overall pore volume, the interstitially, relative uniform spacing and the parameters thereof, but such processes fall without the purview of this invention.

In like manner the procedures which we describe as those which are preferred to produce the catalysts of invention encompass only those procedures devised by us. It is to be expected that other procedures may be suitable for preparation of the catalysts taught herein, even though such other procedures are unknown to us.

We claim:

1. In a catalytic process including hydrocracking and desulfurization for the treatment of residuum hydrocarbon feed wherein said feed is contacted in the presence of a particulate catalytic agent selected from the group consisting of alumina, silica and combinations thereof together with a promoter selected from one group consisting of elements of Group VI$b$ and VIII of the Periodic Table, oxides thereof and combinations thereof wherein the temperatures are between about 600 and about 900° F. and the pressures are between about 500 and about 5,000 p.s.i.g., and wherein the improvement comprises:

said catalytic agent having a total pore volume greater than 0.40 cc./g., a Penetration Number greater than 30%; wherein said total pore volume comprises micropores and access channels, said access channels being interstitially spaced through the structure of the micropores and wherein a first portion of the access channels have diameters between about 100 and about 1000 angstroms, said first portion comprising 10 to 40% of said pore volume and wherein a second portion of the access channels have diameters greater than 1000 angstroms, said second portion comprising 10 to 40% of said pore volume and the remainder of said pore volume being micropores having diameters of less than 100 angstroms and wherein said remainder comprises 20 to 80% of said total pore volume.

2. The process of claim 1 wherein said catalytic process is the desulfurization of residuum hydrocarbon feed material.

3. The process of claim 1 wherein said catalytic process is the hydrocracking of residuum hydrocarbon feed material.

4. The process of claim 1 wherein said feed is contacted with a hydrogen-rich gas at a rate between about 1000 and about 10,000 s.c.f./bbl. and a hydrogen partial pressure between about 65 and about 95% of the total pressure, wherein the space velocity is in the range of from about 0.2 to about 5.0 $V_f/hr./V_r$ and wherein the feed material and gas are passed upwardly through a reaction zone containing said particulate catalytic agent at a rate such as to cause the catalytic agent to be placed in random motion in the liquid.

5. The process of claim 1 wherein the feed contains more than 100 parts per million of metals from the group of nickel and vanadium.

6. The process of claim 3 wherein the process is hydrocracking to obtain more than 60% conversion of the 975° F. plus fractions to lighter boiling products.

7. The process of claim 1 wherein the particles of said catalytic agent have access channels radiating substantially from the center of said particles outwardly to their surface have substantially uniform parameters, are substantially linear in direction, and are substantially uniformly spaced throughout said micropores.

8. The process of claim 1 wherein a portion of said second portion of the access channels of said catalytic agent has diameters within the range of 10,000–50,000 angstroms, these diameters having an average of about 30,000 angstroms.

References Cited

UNITED STATES PATENTS

| | | | |
|---|---|---|---|
| 2,882,221 | 4/1959 | Dinwiddie et al. | 208—216 |
| 2,890,162 | 6/1959 | Anderson, Jr. et al. | 208—216 |
| 2,924,568 | 2/1960 | Anderson, Jr. et al. | 208—216 |
| 3,206,387 | 9/1965 | Smilski | 208—216 |
| 3,245,919 | 4/1966 | Gring et al. | 252—465 |
| 3,267,025 | 8/1966 | Gring et al. | 208—216 |
| 3,322,666 | 5/1967 | Beuther et al. | 208—216 |
| 3,530,066 | 9/1970 | Kuwata et al. | 208—213 |

FOREIGN PATENTS

| | | | |
|---|---|---|---|
| 264,281 | 5/1963 | Australia | 208—216 |

DELBERT E. GANTZ, Primary Examiner

G. J. CRASANAKIS, Assistant Examiner

U.S. Cl. X.R.

208—216; 252—458, 465